(12) United States Patent
Mourer et al.

(10) Patent No.: US 9,931,815 B2
(45) Date of Patent: Apr. 3, 2018

(54) COATINGS FOR METALLIC SUBSTRATES

(71) Applicant: General Electric Company, Schenectady, NY (US)

(72) Inventors: David Paul Mourer, Lynn, MA (US); Leonardo Ajdelsztajn, Niskayuna, NY (US); Kenneth Rees Bain, Cincinnati, OH (US); Andrew Joseph Detor, Niskayuna, NY (US); Andrew William Emge, Cincinnati, OH (US); James Anthony Ruud, Niskayuna, NY (US); Michael James Weimer, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 200 days.

(21) Appl. No.: 14/774,998

(22) PCT Filed: Mar. 12, 2014

(86) PCT No.: PCT/US2014/024299
§ 371 (c)(1),
(2) Date: Sep. 11, 2015

(87) PCT Pub. No.: WO2014/165073
PCT Pub. Date: Oct. 9, 2014

(65) Prior Publication Data
US 2016/0031186 A1 Feb. 4, 2016

Related U.S. Application Data

(60) Provisional application No. 61/779,427, filed on Mar. 13, 2013.

(51) Int. Cl.
*B32B 15/00* (2006.01)
*B32B 15/01* (2006.01)
(Continued)

(52) U.S. Cl.
CPC .......... *B32B 15/013* (2013.01); *B32B 15/015* (2013.01); *C22C 19/055* (2013.01);
(Continued)

(58) Field of Classification Search
None
See application file for complete search history.

(56) References Cited

U.S. PATENT DOCUMENTS

| 4,957,567 A | 9/1990 | Krueger et al. |
| 6,521,175 B1 | 2/2003 | Mourer et al. |

(Continued)

FOREIGN PATENT DOCUMENTS

| CN | 101351576 A | 1/2009 |
| EP | 1793008 A1 | 6/2007 |

(Continued)

OTHER PUBLICATIONS

Goebel et al., "Mechanisms for the Hot Corrosion of Nickel-Base Alloys", Metallurgical and Materials Transactions B, vol. No. 4, Issue No. 1, pp. 261-278, Jan. 1973.
(Continued)

*Primary Examiner* — Daniel J Schleis
(74) *Attorney, Agent, or Firm* — General Electric Company; William Scott Andes

(57) ABSTRACT

Coatings for substrates, such as superalloy substrates, are provided. The coating can include: 15 wt % to 45 wt % cobalt; 20 wt % to 40 wt % chromium; 2 wt % to 15 wt % aluminum; 0.1 wt % to 1 wt % yttrium; and nickel. The coatings may include nickel, cobalt, chromium and aluminum, and other optional additives to improve oxidation and corrosion resistance of the substrate without significant debit to its mechanical properties.

16 Claims, 11 Drawing Sheets

(51) Int. Cl.
    *F01D 5/28*     (2006.01)
    *C23C 4/18*     (2006.01)
    *C23C 10/28*     (2006.01)
    *C23C 4/067*     (2016.01)
    *C22C 19/05*     (2006.01)

(52) U.S. Cl.
    CPC ............ *C22C 19/058* (2013.01); *C23C 4/067* (2016.01); *C23C 4/18* (2013.01); *C23C 10/28* (2013.01); *F01D 5/288* (2013.01); *F05D 2300/175* (2013.01)

(56) References Cited

U.S. PATENT DOCUMENTS

| | | |
|---|---|---|
| 6,532,657 B1 | 3/2003 | Weimer et al. |
| 6,921,251 B2 | 7/2005 | Ackerman et al. |
| 6,926,928 B2 | 8/2005 | Ackerman et al. |
| 6,933,012 B2 | 8/2005 | Das et al. |
| 6,964,791 B2 | 11/2005 | Zhao et al. |
| 6,969,240 B2 | 11/2005 | Strangman |
| 7,311,940 B2 | 12/2007 | Nagaraj et al. |
| 7,314,674 B2 | 1/2008 | Hazel et al. |
| 7,364,801 B1 | 4/2008 | Hazel et al. |
| 7,422,769 B2 * | 9/2008 | Kassner ............... C23C 4/12 416/241 R |
| 7,455,890 B2 | 11/2008 | Darolia et al. |
| 7,479,299 B2 | 1/2009 | Raybould et al. |
| 7,546,683 B2 | 6/2009 | Hazel et al. |
| 7,601,400 B2 | 10/2009 | Buczek et al. |
| 7,604,867 B2 | 10/2009 | Hazel et al. |
| 7,666,515 B2 | 2/2010 | Nagaraj et al. |
| 7,687,105 B2 | 3/2010 | Spitsberg et al. |
| 7,919,187 B2 | 4/2011 | Hazel et al. |
| 7,955,694 B2 | 6/2011 | Hazel et al. |
| 8,124,246 B2 | 2/2012 | Tolpygo |
| 8,992,699 B2 | 3/2015 | Bain et al. |
| 8,992,700 B2 | 3/2015 | Bain et al. |
| 2004/0131865 A1 * | 7/2004 | Kim ............... C23C 4/02 428/433 |
| 2005/0255329 A1 | 11/2005 | Hazel |
| 2007/0128363 A1 | 6/2007 | Rice et al. |
| 2008/0163785 A1 * | 7/2008 | Hardwicke ............ B32B 15/01 106/1.21 |
| 2009/0011260 A1 | 1/2009 | Chandra et al. |
| 2009/0155120 A1 * | 6/2009 | Stamm ............... B32B 15/01 420/588 |
| 2011/0293919 A1 | 12/2011 | Ajdelsztajn et al. |
| 2012/0076662 A1 | 3/2012 | Tryon et al. |
| 2012/0328900 A1 | 12/2012 | Schmitz et al. |

FOREIGN PATENT DOCUMENTS

| | | |
|---|---|---|
| EP | 1925687 A1 | 5/2008 |
| EP | 1953253 A1 | 8/2008 |
| JP | 4323357 A | 11/1992 |

OTHER PUBLICATIONS

Jones, "Hot Corrosion in Gas Turbines", Corrosion in Fossil Fuel Systems, The Electrochemical Society, vol. No. 33, Issue No. 5, pp. 341-364, 1983.

Unofficial English Translation of Chinese Office Action issued in connection with corresponding CN Application No. 201480014278.2 dated Sep. 29, 2016.

F. Tang et. al.: "Influence of Cryomlling on the Morphology and Composition of the Oxide Scales Formed on HVOF CoNiCrAly Coatings", Oxidation of Metals, vol. 61, No. 3/4, Apr. 1, 2004, pp. 219-238, XP055127445, ISSN: 0030-770X, DOI:10.1023/B:OXID. 0000025332.26757.41, p. 222-p. 225.

International Search Report and Written Opinion issued in connection with corresponding application PCT/US14/024299, dated Jul. 18, 2014.

Machine translation and Office Action issued in connection with Corresponding CN Application No. 201480014278.2 dated May 25, 2017.

* cited by examiner 15.0kV 6.9mmx500 SE(M) 9/13/2011 100um 15.0kV 7.0MMx500 SE(M) 12/15/2011 100um 15.0kV 7.1mmx 3.50k YAGBSE 9/27/2011    10.0um GE_Confid 15.0kV 7.1mmx 3.00kYAGBSE 3/22/2012   10.0um mag    WD      HV      HFW     det              10μm
5000x  13.0mm  20.00kV 20.8μm  BSED  2808-02   (6885A-I-W22)

COATINGS FOR METALLIC SUBSTRATES

CROSS-REFERENCE TO RELATED APPLICATIONS

The present application is a National Phase of International Application No. PCT/US14/024299, filed Mar. 12, 2014, which claims priority to U.S. Provisional Patent Application Ser. No. 61/779,427 of Mourer, et al. titled "Coatings for Metallic Substrates" filed on Mar. 13, 2013; the disclosure of which is incorporated by reference herein.

FIELD OF THE INVENTION

The present invention generally relates to coatings for metallic substrates, such as gas turbine engine components. Such components may include, but are not limited to disks, seals, and other rotor components, blades, and structural components. More particularly, an embodiment of the present invention relates to metallic coatings that are adherent and compatible with disk alloys and provide them with protection from oxidation and hot corrosion.

BACKGROUND OF THE INVENTION

The turbine section of a gas turbine engine contains a rotor shaft and one or more turbine stages, each having a turbine disk (or rotor) mounted or otherwise carried by the shaft and turbine blades mounted to and radially extending from the periphery of the disk. Adjacent stages of the turbine are separated by a non-rotating nozzle assembly with vanes that direct the flow of combustion gases through the turbine blades. Seal elements reduce leakage between the rotating and non-rotating (static) components of the turbine section, and channel cooling air flow to the turbine blades and vanes.

Turbine components are formed of superalloy materials to provide acceptable mechanical properties at the elevated temperatures within the turbine section of a gas turbine engine. In particular, turbine airfoil components such as blades and vanes are often formed of equiaxed, directionally solidified (DS), or single crystal (SX) superalloys. Turbine disks and seal elements are typically formed of polycrystalline superalloys that undergo carefully controlled forging, heat treatments, and surface treatments such as peening to achieve desirable grain structures and mechanical properties.

Though significant advances in high temperature capabilities of superalloys have been achieved, turbine components located in the hot gas flow path, such as the blades and vanes, are susceptible to damage by oxidation and hot corrosion attack. Thus, turbine components are therefore typically protected by an environmental coating alone or an environmental coating acting as a bond coat along with a thermal barrier coating (TBC) to form a TBC system. Environmental coatings and TBCs that are widely used on turbine blades and vanes include diffusion aluminide coatings and alloys such as MCrAlX overlay coatings, where M is iron, cobalt and/or nickel and X is one or more of yttrium, other rare earth elements, and reactive elements. The aluminum contents of diffusion aluminide and MCrAlX coatings contribute to and promote the formation of a stable and environmentally protective alumina ($Al_2O_3$) scale on their surfaces at the operating temperatures of turbine blades and vanes.

As operating temperatures of gas turbine engines continue to increase, the turbine disks are subjected to higher temperatures. As a result, corrosion of the disks/shafts and other rotor components has become of concern. Corrosion of turbine disks and other turbine rotor components has been attributed to deposition of solid particles containing metal sulfates or other metal sulfur oxides plus reducing agents, the reaction of the deposited particles with the disk alloy at high temperatures to form reduced metal sulfides covered by air-impermeable fused solid particles, and other corrosive agents including mixtures of alkaline sulfates, sulfites, chlorides, carbonates, oxides and other corrosive salt deposits.

Various corrosion barrier coatings have been investigated to prevent the corrosion of turbine disks from this type of attack. A continuous surface layer of a protective oxide, such as chromia ($Cr_2O_3$) or alumina ($Al_2O_3$), is required to provide good corrosion resistance within the hot gas path of a gas turbine engine. Research reported in Goebel et al., "Mechanisms for the Hot Corrosion of Nickel-Base Alloys," Met Trans, 4, 1973, 261, showed that increasing levels of chromium, and as a secondary effect increasing levels of aluminum, promote the formation of an oxide scale with increased corrosion resistance. R. L. Jones, in "Hot Corrosion in Gas Turbines," Corrosion in Fossil Fuel Systems, The Electrochemical Society, Princeton, N.J. (1983), 341-364, proposed that chromium and aluminum contents of at least 15 weight percent (wt %) and less than 5 weight percent, respectively, are necessary in an embodiment to form a protective chromia scale, and that chromium and aluminum contents of at least 5 weight percent each are necessary to more particularly form a protective alumina scale in NiCrAl [based] alloys.

While the above discussion is specifically directed to corrosion resistance, it is generally understood that oxidation performance will also increase with a more continuous protective oxide scale, such as the chromia and/or alumina scales described above. For example, chromium-rich vapor deposited coatings have long been used to protect oxidation-prone alloys such as the Inconel® 90X series (IN 901, 903, 907, 909), available from Special Metals Corp.

Corrosion barrier coatings may be applied to a metallic substrate in a number of ways. For example, corrosion barrier coatings, including aluminides, chromides, and oxides may be deposited by metallo organic chemical vapor deposition (MO-CVD), pack Aluminides, chromides or silicides, ion implanted aluminum, metal nitrides, and metal carbides. Particular examples of these approaches are disclosed in commonly-assigned U.S. Pat. Nos. 6,532,657, 6,921,251, 6,926,928, 6,933,012, and 6,964,791, and commonly-assigned U.S. Patent Application Publication Nos. 2005/0031794 and 2005/0255329. One approach involving painting layers of corrosion barrier coatings has been hampered by the susceptibility of such paints to spall during engine operation. Such spallation is believed to be caused by a significant coefficient of thermal expansion (CTE) mismatch between the layered paint and the alloy it protects, which results in high interfacial strains during thermal transient engine conditions. Adhesion of layered paints is likely limited in part by the reliance on mechanical adhesion between the paint and alloy, which can be improved to some extent by grit blasting the surface to be coated prior to depositing the paint or other means of surface modification to enhance mechanical adhesion well known in the art. However, spallation remains an impediment to the use of layered paints in many applications or in specific areas of a component.

In addition to corrosion, fatigue testing has shown that current disk alloys are also susceptible to general oxidation or localized grain boundary oxidation if subjected to higher operating temperatures over extended periods of time.

Therefore, extended operation at higher turbine operating temperatures may also require protection of turbine disks from oxidation.

Corrosion barrier coatings are not necessarily effective as oxidation barriers or inhibitors, particularly for extended exposures at high temperatures. For example, though the MO-CVD aluminide and chromide coatings and metallic carbide and nitride coatings noted above are also potentially capable of serving as barriers to oxidation, these corrosion barrier coatings are believed to have limitations that may render them unsatisfactory for use as protective coatings on turbine disks and seals, such as limited adhesion, CTE mismatch, low volume processing, and chemical interactions with the types of alloys often used to form turbine disks and seals. Although aluminide coatings exhibit excellent adhesion, corrosion and oxidation resistance, they can negatively impact the fatigue life of a disk. Chromide coatings also exhibit great adhesion and corrosion resistance, as well as acceptable ductility if the undesirable alpha-chromium phase does not form or does not form in a large volume fractions or semi-continuous regions. Processing temperatures typically required to form most chromide and aluminide coatings, however, are above the age temperatures of many turbine disk and seal materials which make their use difficult on forged parts. Nitride and carbide coatings are generally subject to the same limitations noted above for aluminide and chromide coatings. Alternatively, oxide coatings, including those applied by MO-CVD, are excellent corrosion barriers and are not detrimental to fatigue properties, but their thermal expansion mismatch with superalloys limits their adhesion.

Accordingly, it may be desirable to provide a protective coating material that is both mechanically and chemically suitable for use on turbine disks as well as being highly resistant to oxidation and corrosion. Such a coating material can also be spall resistant and have an acceptable CTE match and limited mechanical property interaction with disk alloys over extended time at high operating temperatures. In addition, such a coating material may be compatible with the typical processing or processing sequences required for polycrystalline superalloys from which turbine disks are typically formed.

BRIEF DESCRIPTION OF THE INVENTION

Aspects and advantages of the invention will be set forth in part in the following description, or may be obvious from the description, or may be learned through practice of the invention.

A turbine component is generally provided that includes a superalloy substrate and a coating on the superalloy substrate. The coating generally defines an external surface of the turbine component that is exposed to a hot gas flow path in a gas turbine. The coating generally includes: 15 wt % to 45 wt % cobalt; 20 wt % to 40 wt % chromium; 2 wt % to 15 wt % aluminum; 0.1 wt % to 1 wt % yttrium; and nickel. In one particular embodiment, the coating includes 55 wt % to 75 wt % of a combined amount of nickel and cobalt.

The coating can have, in certain embodiments, a thickness that is 5 μm to 100 μm, in another embodiment 10 μm to about 90 μm, and more particularly 12 μm to 75 μm. The average grain size of the coating can be, in particular embodiments, 0.1 microns to 5 microns, more particularly 0.5 microns to 2.5 microns.

The coating can include a distribution of pinning agents, which can be located on the interfaces between grains defined in the coating. For example, the pinning agents can include ceramic particles, such as oxides of aluminum, titanium, yttrium, hafnium, zirconium, lanthanum, or mixtures thereof; carbides of titanium, tantalum, niobium, zirconium, hathium, or mixtures thereof; oxy-nitrides of titanium, tantalum, niobium, hafnium, zirconium, and yttrium or mixtures thereof; or a combination thereof. In one embodiment, the coating can consist essentially of: 30 wt % to 40 wt % cobalt; 22 wt % to 25 wt % chromium; 8 wt % to 12 wt % aluminum; 0.1 wt % to 1 wt % yttrium; nickel; and a distribution of pinning agents.

In certain embodiments, the coating can also include 0 wt % to 10 wt % tungsten; 0 wt % to 10 wt % tantalum; 0 wt % to 0.5 wt % hafnium; 0 wt % to 0.5 wt % silicon; at least one of lanthanum, cerium, zirconium, magnesium, a rare earth metal; or a combination thereof. Additionally or alternatively, the coating can further include: tungsten, molybdenum, tantalum, rhenium, titanium, niobium, vanadium, a platinum group metal, or a combination thereof; with the total combined amount of these elements being 20 wt % or less.

In one particular embodiment, the coating consisting essentially of 30 wt % to 40 wt % cobalt; 22 wt % to 25 wt % chromium; 8 wt % to 12 wt % aluminum; 0.1 wt % to 1 wt % yttrium; and nickel.

A gas turbine is also generally provided that includes a turbine component, such as described above, positioned within a hot gas path of the gas turbine such that the coating protects the superalloy substrate from the hot gas within the gas turbine. That is, the coating is directly exposed to the hot gas within the gas turbine and provides corrosion resistance to the underlying superalloy substrate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
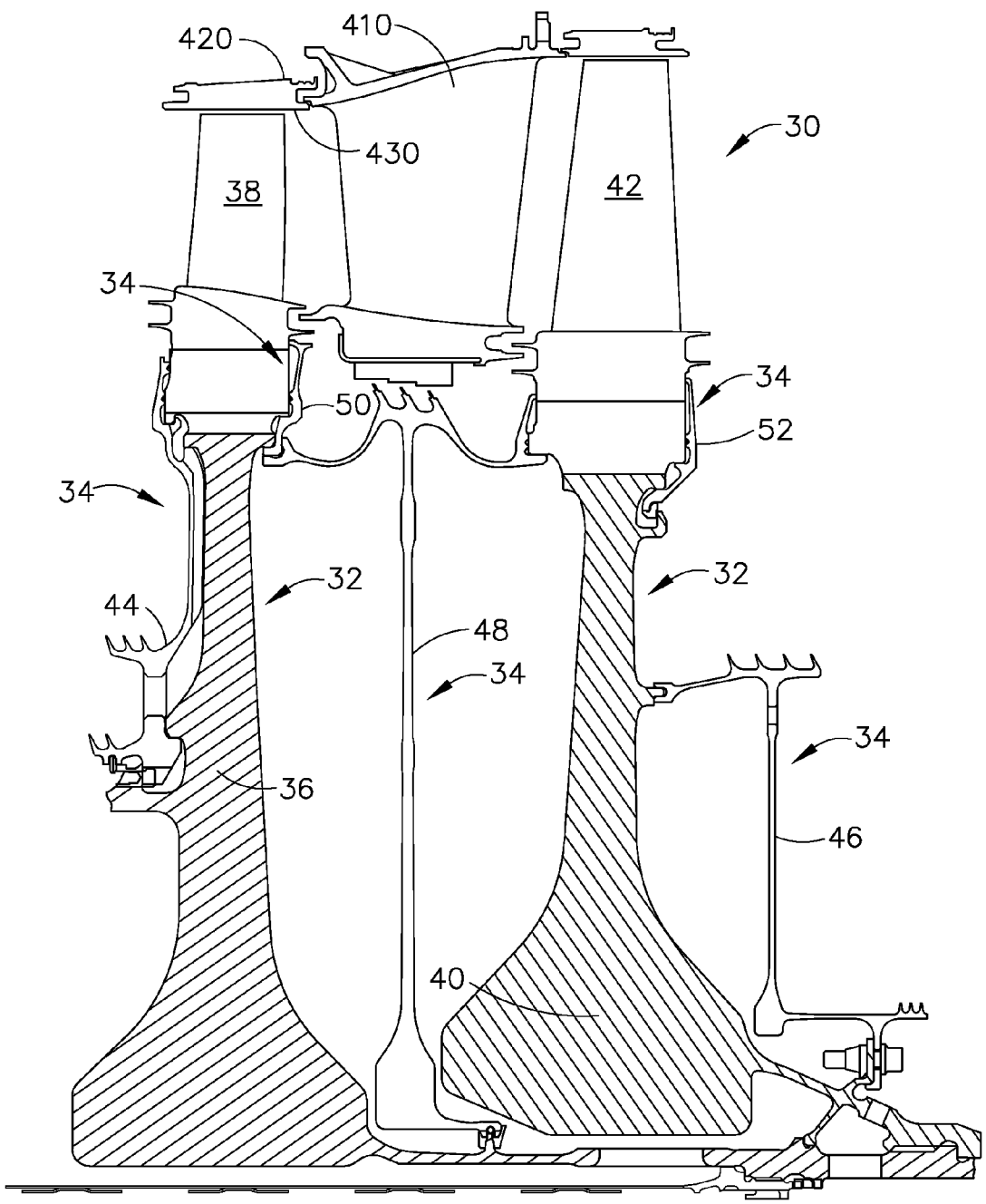
FIG. 1 is a cross-sectional view of a portion of the turbine section of an exemplary gas turbine engine according to an embodiment of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Coatings are generally provided for metallic substrates, such as gas turbine engine components. Such components may include, but are not limited to disks, seals, and other rotor components, blades, and structural components. The coatings may include nickel, cobalt, chromium and aluminum, and other optional additives to improve oxidation and corrosion resistance of the substrate without significant debit to its mechanical properties. The coatings are adherent to and physically and chemically compatible with metallic substrate. Compositions, microstructures, and coating thicknesses are also provided that provide ductility and durability to avoid significant cyclic life reductions relative to the substrate.

FIG. 1 is a cross-sectional view depicting a portion of the turbine section of a gas turbine engine along the centerline of the engine. The turbine section 30, shown, is a two stage turbine, although any number of stages may be employed depending on the turbine design. The present invention is not limited by the number of stages in the turbine shown. Turbine disks 32 are mounted on a shaft (not shown) extending through a bore in disks 32 along the centerline of the engine, as shown. A first stage blade 38 is attached to first stage disk 36, while second stage blade 42 is attached to second stage disk 40. A vane 410 extends from a casing 420. The inner surface of casing 420 forms a liner 430 for the hot gases of combustion which flow in the gas flow path. The first stage blade 38, the second stage blade 42 and the vane 410 extend into the hot gas flow path. The vane 410 is stationary and serves to direct the hot gas flow while blades 38, 42 mounted on disks 36, 40 rotate as the hot gases impinge on them, extracting energy to operate the engine.

Sealing elements 34, a forward seal 44, an aft seal 46, an interstage seal 48, a stage 1 aft blade retainer 50 and a stage 2 aft blade retainer 52, serve to seal and complete the compressor air cooling circuits to the turbine blades and nozzles. These seals are in contact with the disks and rotate with the disks. Interstage seal 48 is positioned inboard of vane 410 and between the first stage disk 36 and the second stage disk 40. Also shown are optional blade retainers 50, 52 which lock the blades to the disks. The design of such retainers will vary dependent on engine design, with some engine designs not requiring them.

These seals and blade retainers are heated to the temperatures of the cooling circuit air they direct. In addition, the parts closest to the combustion path are also heated by conductive heat transfer from the combustion path parts. For example, the rim of the turbine disks 32 are conductively-heated by the turbine blades 38, 42. Contaminants in the cooling air, as previously discussed, deposit on the surfaces of the disks, seals and retainers that form the cooling cavities and are the source of contamination at these elevated temperatures. Thus, the coatings discussed herein can provide protection to any of these surfaces that are subject to corrosion due to deposition or accumulation of the cooling air contaminants.

Figure 2:
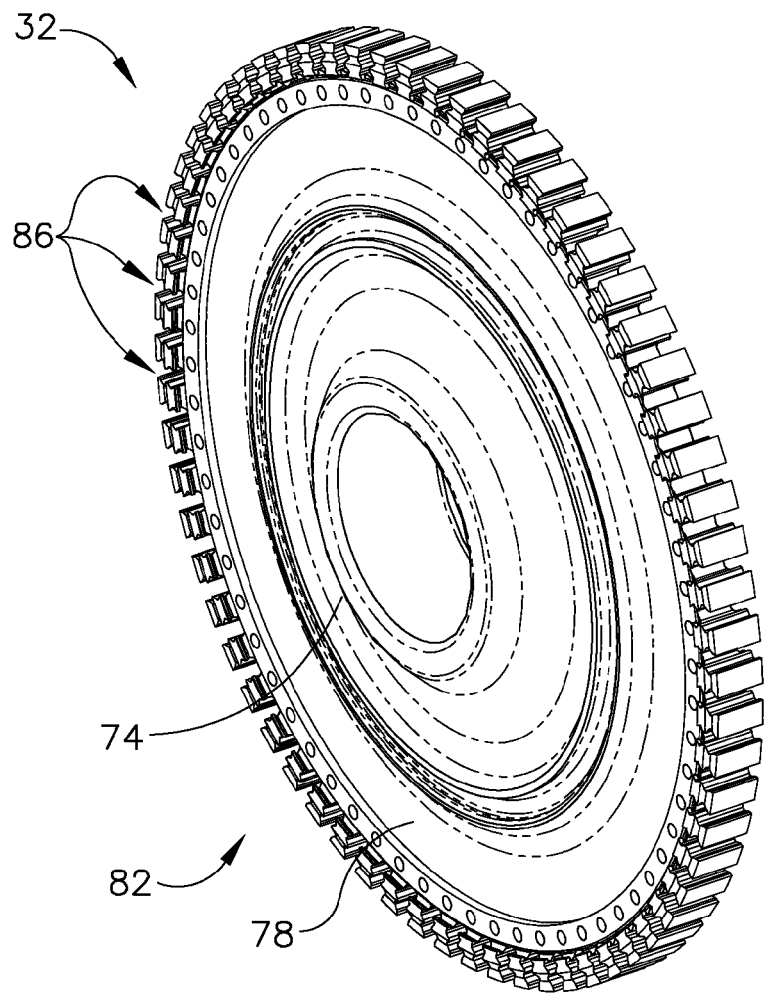
FIG. 2 is a perspective view of an exemplary turbine disk of a type used in gas turbine engines according to an embodiment of the present invention.

FIG. 2 is a perspective view of a typical gas turbine engine disk 82 such as disk 36 or 40 of FIG. 1, which is typically made of a superalloy material, such as one of the superalloy materials previously discussed. The disk 82 includes a hub 74 along typically the engine centerline that includes a bore through which a shaft (not shown) extends. The disk includes dovetail slots 86 along the disk outer periphery into which the turbine blades 38, 42 are inserted. A web section 78 of the disk 82 extends between the outer periphery, where the dovetail slots are located, and the hub. While the present invention, including the base coating and temporary organic coating, may be utilized anywhere along disk 82, including the dovetail slots 86, it finds particular use along the surfaces of web section 78 and the dovetail slots 86, which unlike the bore in hub 74, is directly exposed to the high temperature cooling air. Those skilled in the art will appreciate that the teachings and benefits of an embodiment of the present invention are also applicable to compressor disks and blisks of gas turbine engines, as well as numerous other components that are subjected to stresses at high temperatures and therefore require a high temperature dwell capability.

Suitable alloys for a disk or seal may include, but are not limited to nickel-based superalloys, cobalt-based superalloys, or iron-based superalloys. Such superalloys typically have a polycrystalline structure, but may have portions with a single-crystal or directionally solidified crystalline structure as described in U.S. Pat. No. 6,969,240, for example. For example, the superalloy may include gamma prime-strengthened nickel-base superalloys such as René® 88DT (R88DT, as described in U.S. Pat. No. 4,957,567) and René® 104 (R104, as described in U.S. Pat. No. 6,521,175) commercially available from Reade, as well as certain nickel-base superalloys commercially available under the trademarks Inconel®, Nimonic®, and Udimet® from Special Metals Corporation. In addition, the superalloys may include those described in U.S. patent application Ser. Nos. 12/474,580 and 12/474,651. Further, alloys that may be used to make blades, such as René® N5, René® N6, and René® 77, may also be included.

Figure 3:
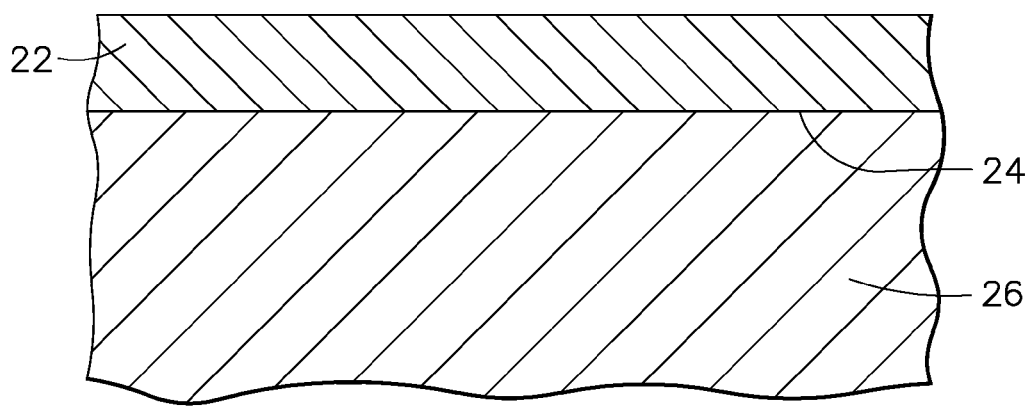
FIG. 3 schematically represents a cross-sectional view of a corrosion and oxidation-resistant coating on a surface of one or more of the turbine components in FIG. 1 according to an embodiment of the present invention.

FIG. 3 schematically represents an oxidation and corrosion-resistant coating 22 deposited on a surface region 24 of a substrate 26 according to an embodiment of the present invention. The substrate 26 may be any portion of the seals and disks of FIGS. 1 and 2.

The coating 22 may include a composition and have microstructure and thickness that provides corrosion and oxidation resistance, suitable for protecting turbine components, and particularly turbine disks formed of polycrystalline superalloys. Thus, the coating 22 is positioned to define an external surface of the substrate 26 such that the coating 22 is directly exposed to the hot gas flow path, and provides corrosion and oxidation resistance of the turbine component. As such, no additional layer is present on the coating 22 such that the coating 22 defines an external surface of the turbine component.

The coating's composition has a CTE that closely matches that of substrates widely used for turbine disks and exhibits limited mechanical property interactions with such superalloys over an extended period of time at high temperatures. Furthermore, the coating is capable of being metallurgically bonded to such superalloys to be highly resistant to spalling.

The coating is not required to support a substantial load during operation, and fatigue performance is essentially determined by the underlying substrate. As such, the coating does not adversely impact the fatigue properties of the turbine disk. Further, the coating resists crack initiation and its excellent environmental resistance drives crack initiation sites internally within the substrate, where grain facets, inclusions, and other common defects are likely to initiate cracking Finally, the coating is compatible with processing typically associated with polycrystalline superalloys used to form turbine disks and sealing elements. In particular, the ductility and limited thickness of the coating permits surface enhancement of the component by methods including, but not limited to peening and burnishing, to induce a residual compressive stress in the turbine disk or seal, without cracking the coating.

The metallic composition of the coating 22 of an embodiment of the present invention may include a nickel, cobalt, more particularly gamma-Ni matrix, gamma-Co matrix, or a mixture of nickel and cobalt. For low temperature operation, the cobalt content of the inventive coating may be low or absent. For higher temperature operation where diffusion levels are important, cobalt content is in an embodiment to reduce or substantially eliminate measurable undesirable coating substrate interdiffusion. The composition may further include chromium and aluminum. The oxidation and/or corrosion resistance of the coating may be promoted by optional additions, including, but not limited to tungsten, tantalum, hafnium, silicon, and yttrium. Other optional additions including but not limited to lanthanum, cerium, zirconium, magnesium, and other rare earth or reactive metals may also be added to obtain enhanced environmental resistance.

In some exemplary embodiments according to at least some aspects of the present invention, the coating composition may include about 0 wt % to about 50 wt % cobalt about 15 to about 45 wt % cobalt, or about 30 to about 40 wt % cobalt. In some example embodiments according to at least some aspects of an embodiment of the present invention, the coating composition may include about 20 wt % to about 40 wt % chromium, about 21 wt % to about 30 wt % chromium, or about 22 wt % to about 25 wt % chromium. In some example embodiments according to at least some aspects of an embodiment of the present invention, the coating composition may include about 2 wt % to about 15 wt % aluminum, about 5 wt % to about 14 wt % aluminum, or about 8 wt % to about 12 wt % aluminum. In some example embodiments according to at least some aspects of an embodiment of the present invention, the coating composition may include about 0 wt % to about 10 wt % tungsten, about 0 wt % to about 8 wt % tungsten, or about 0 wt % to about 6 wt % tungsten. In some example embodiments according to at least some aspects of an embodiment of the present invention, the coating composition may include about 0 wt % to about 10 wt % tantalum, about 0 wt % to about 6 wt % tantalum, or about 0 wt % to about 4 wt % tantalum. In some example embodiments according to at least some aspects of an embodiment of the present invention, the coating composition may include about 0 wt % to about 0.5 wt % hafnium, about 0 wt % to about 0.2 wt % hafnium, or about 0 wt % to about 0.1 wt % hafnium. In some example embodiments according to at least some aspects of an embodiment of the present invention, the coating composition may include about 0 wt % to about 0.5 wt % silicon, about 0 wt % to about 0.3 wt % silicon, or about 0 wt % to about 0.1 wt % silicon. In some example embodiments according to at least some aspects of an embodiment of the present invention, the coating composition may include about 0 wt % to about 2 wt % yttrium, about 0.1 wt % to about 1 wt % yttrium, or about 0.3 wt % to about 1 wt % yttrium. Any combination of the above compositions for the constituents of the coating may be used, with balance nickel. The compositional ranges set forth above are summarized in Table 1 below:

TABLE 1

| Component | Range (wt %) | Range (wt %) | Range (wt %) |
|---|---|---|---|
| Co | 0-50 | 15-45 | 30-40 |
| Cr | 20-40 | 21-30 | 22-25 |
| Al | 2-15 | 5-14 | 8-12 |
| W | 0-10 | 0-8 | 0-6 |
| Ta | 0-10 | 0-6 | 0-4 |
| Hf | 0-0.5 | 0-0.2 | 0-0.1 |
| Si | 0-0.5 | 0-0.3 | 0-0.1 |
| Y | 0-2 | 0.1-1 | 0.3-1 |
| Ni | Balance | Balance | Balance |

According to an embodiment of the present invention, the coating composition may include about 0 wt % to about 50 wt % cobalt, about 20 wt % to about 40 wt % chromium, about 2 wt % to about 15 wt % aluminum, about 0 wt % to about 10 wt % tungsten, about 0 wt % to about 10 wt % tantalum, about 0 wt % to about 0.5 wt % hafnium, about 0 wt % to about 0.5 wt % silicon, about 0 wt % to about 2 wt % yttrium, and balance nickel.

According to another embodiment of the present invention, the coating composition may include about 15 to about 45 wt % cobalt, about 21 wt % to about 30 wt % chromium, about 5 wt % to about 14 wt % aluminum, about 0 wt % to about 8 wt % tungsten, about 0 wt % to about 6 wt % tantalum, about 0 wt % to about 0.2 wt % hafnium, about 0 wt % to about 0.3 wt % silicon, about 0.1 wt % to about 1 wt % yttrium, and balance nickel.

According to another embodiment of the present invention, the coating composition may include about 30 to about 40 wt % cobalt, about 22 wt % to about 25 wt % chromium, about 8 wt % to about 12 wt % aluminum, and about 0.3 wt % to about 1 wt % yttrium, and balance nickel.

According to an embodiment of the present invention, the coating composition may contain about 55 to about 75 wt % of a total combined amount of nickel and cobalt. For high temperature operation, according to an embodiment of the present invention, the concentration of cobalt may be about 30 to about 50 wt %.

The example coatings as described above may provide various properties. Including aluminum in the coating may enhance the corrosion resistance and particularly the oxidation resistance of the coated article. The upper limit for the aluminum content in the coating may also be less than the nominal aluminum content for the gamma prime nickel aluminide phase ($Ni_3Al$), which increases the coating strength and can also serve to aid in maintenance of fine grain size in the coating, assuming operating temperatures are subsolvus relative the gamma prime phase. As a result, the coating may contain limited amounts of the gamma prime phase if aluminum is present.

In general, for corrosion resistance, the chromium content in the coating may be higher than in the base metal. When chromium levels are sufficient to provide basic corrosion resistance, the environmental resistance is enhanced when sufficient aluminum is present to develop a predominately alumina based scale.

The coating's oxidation resistance helps to inhibit general oxidation or selective grain boundary oxidation of the superalloy that it protects, thereby preserving the fatigue life of the disk. When applied to gamma prime-strengthened nickel-base superalloys, the coating of an embodiment of the present invention may remain adherent through metallurgical bonding and CTE compatibility with the substrate. In addition, the coating has limited mechanical property impact and allows surface residual stress enhancements typical of rotor alloy processing, and enhancements such as peening may in fact enhance coating behavior. Because the composition of the coating is similar to that of the substrate it protects, wear mechanisms are also expected to be similar such that the coating can be used on surfaces subjected to wear from surface-to-surface contact with a surface of another component.

The oxidation and/or corrosion resistance of the coating may be promoted by optional modifications to the coating 22, such as additions of lanthanum, cerium, zirconium, magnesium, and other rare earth or reactive metals for sulfur gettering, oxide pinning, etc. Though strength is of secondary concern for the coating because load-bearing and fatigue performance are typically determined by the underlying substrate 26, the coating 22 may be optionally strengthened with tungsten, molybdenum, tantalum, rhenium, titanium, niobium, vanadium, and/or a platinum group metal (PGM) to improve fatigue resistance. However, in an embodiment, additions of these elements are limited to less than 20 weight percent combined, as they can reduce ductility and may negatively affect corrosion and oxidation resistance, especially tungsten and molybdenum. With such limited additions, strengtheners can enable the coating to bear some of the load during operation of a turbine disk, though maintaining sufficient ductility and environmental resistance to avoid surface-initiated fatigue cracking.

Table 2 below provides example compositions, where concentrations of the elements are given in weight percent. As indicated in Table 2, the "CoNiCrAlY coating" is a more particular coating nominal composition according to one embodiment of the present invention.

TABLE 2

| Coating | Ni | Co | Cr | Al | Ta | W | C | Hf | B | Zr | Y | Si |
|---|---|---|---|---|---|---|---|---|---|---|---|---|
| NiCr | 77.5 | — | 22.5 | — | — | — | — | — | — | — | — | — |
| NiCrAlY | 67.0 | — | 22.0 | 10.0 | — | — | — | — | — | — | 1 | — |
| CoNiCrAlY | 32.0 | 35.7 | 22.0 | 10.0 | — | — | — | — | — | — | 0.3 | — |
| GE-Ni2 | 62.9 | — | 25.0 | — | 7.30 | 7.80 | — | — | — | — | — | — |
| GE-Ni3 | 63.5 | — | 25.0 | — | 6.00 | 8.00 | — | 0.20 | — | — | — | 0.30 |
| GE-Ni4 | 60.6 | — | 25.0 | 2.00 | 6.00 | 8.00 | — | 0.20 | — | — | — | 0.30 |
| GE-Ni6 | 75.0 | — | 25.0 | — | — | — | — | — | 0.050 | — | — | — |
| GE-Ni7 | 57.4 | 15.0 | 25.0 | 2.5 | — | — | 0.05 | — | 0.030 | 0.05 | — | — |
| GE-Ni8 | 74.9 | — | 25.0 | — | — | — | 0.05 | — | 0.030 | 0.05 | — | — |

Figure 6:
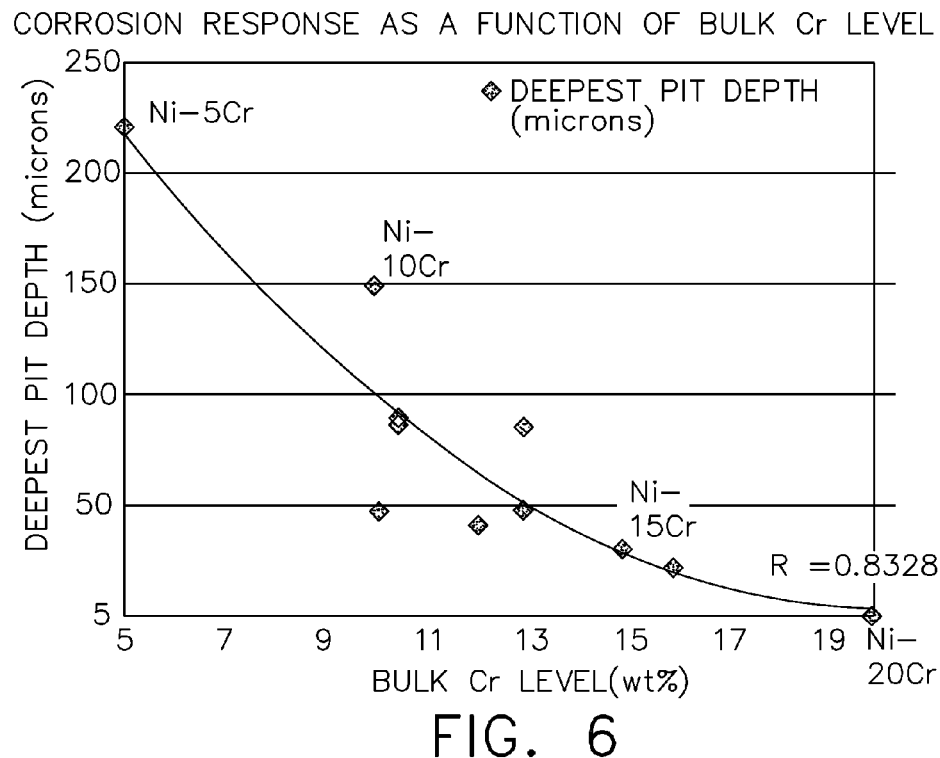
FIG. 6 is a plot of corrosion pitting as a function of chromium content in wt % in Ni-based alloys.

The concentration of chromium in the coating may affect various properties, such as corrosion pitting. FIG. 6 is a plot of corrosion pitting as a function of chromium concentration (wt %) in Ni-based alloys including both simple Ni—Cr compositions and highly complex multi-element coating compositions. As indicated in FIG. 6, as the concentration of chromium increases, the deepest pit depth decreases, indicating the role of chromium level as a significant factor conferring corrosion resistance. Based on the nickel-chromium phase diagram, the upper limit of chromium concentration may be set to avoid the formation of single-phase alpha chromium.

Figure 7:
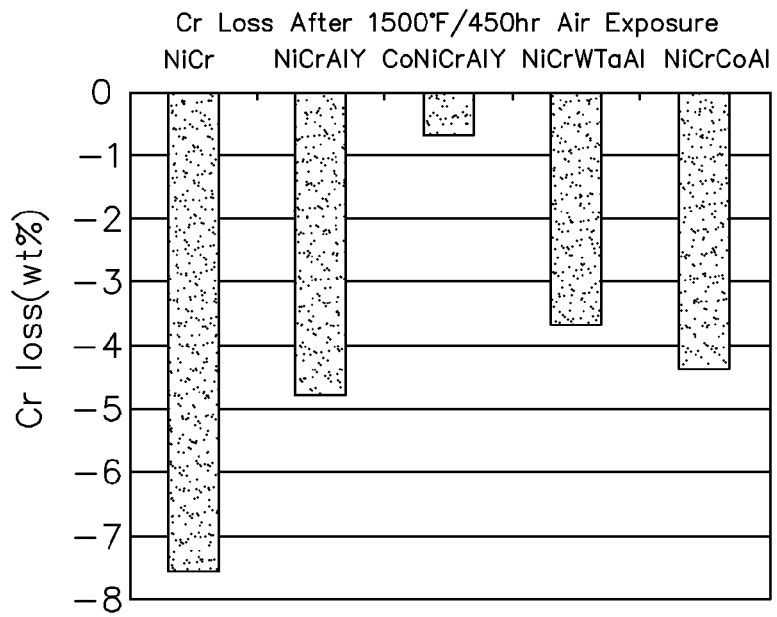
FIG. 7 is a plot of chromium loss after about 815° C./450 hr (1500° F./450 hr) air exposure for different coating compositions.

In addition, chromium retention in the coating may be beneficial in preventing hot corrosion. It has been shown that coatings that contain an addition of aluminum retain higher levels of chromium during thermal exposures. FIG. 7 is a plot of chromium retention after about 815° C./450 hr (1500° F./450 hr) air exposure for different coating compositions. FIG. 7 indicates that coatings that contain cobalt, aluminum, and yttrium additions provide the highest level of chromium retention.

Coating behavior may be further enhanced by controlling interdiffusion between the coating and the substrate. According to an embodiment of the present invention, there is substantially no interdiffusion between the coating and base metal. According to another embodiment of the present invention, there is substantially no cobalt interdiffusion between the coating and substrate. Without wishing to be constrained by a particular theory, such diffusion may be driven by the energetics of the coating and base metal interface as acted upon by the pre-coating preparation process and the coating process itself along with the necessary compositional gradients and thermal environment. Diffusion of base metal elements into the coating and adverse effects on coating performance may be beneficially reduced by addition of the diffusing species to the coating composition. Additionally, the stability of the substrate nickel-based rotor alloys may be improved when such interdiffusion is minimized.

Cobalt typically stabilizes the coating and minimizes diffusion driven degradation of the substrate material. In addition, beneficial effects of cobalt in combatting hot corrosion may provide an enhancement in corrosion behavior in severe environments. Cobalt diffusion into the coating may occur readily as cobalt is typically present in high strength nickel base superalloys. The melting temperature of $Co_4S_3$—Co eutectic (1150 K/877° C./1610° F.) is likely above the typical coating use temperature versus $Ni_3S_2$—Ni eutectic (980 K/707° C./1304° F.) which is at or below likely use temperatures, as described in ASM Specialty Handbook: Nickel, Cobalt, and Their Alloys, ASM International Handbook Committee, Joseph R. Davis, Jan. 15, 2001. In an embodiment, while not wishing to be held to a particular theory, Ni—Co balance may balance the overall lower diffusivity, lower inter diffusion and complex Ni—Co—S eutectics in a fashion to use this behavior to improve the corrosion resistance.

Figure 8:
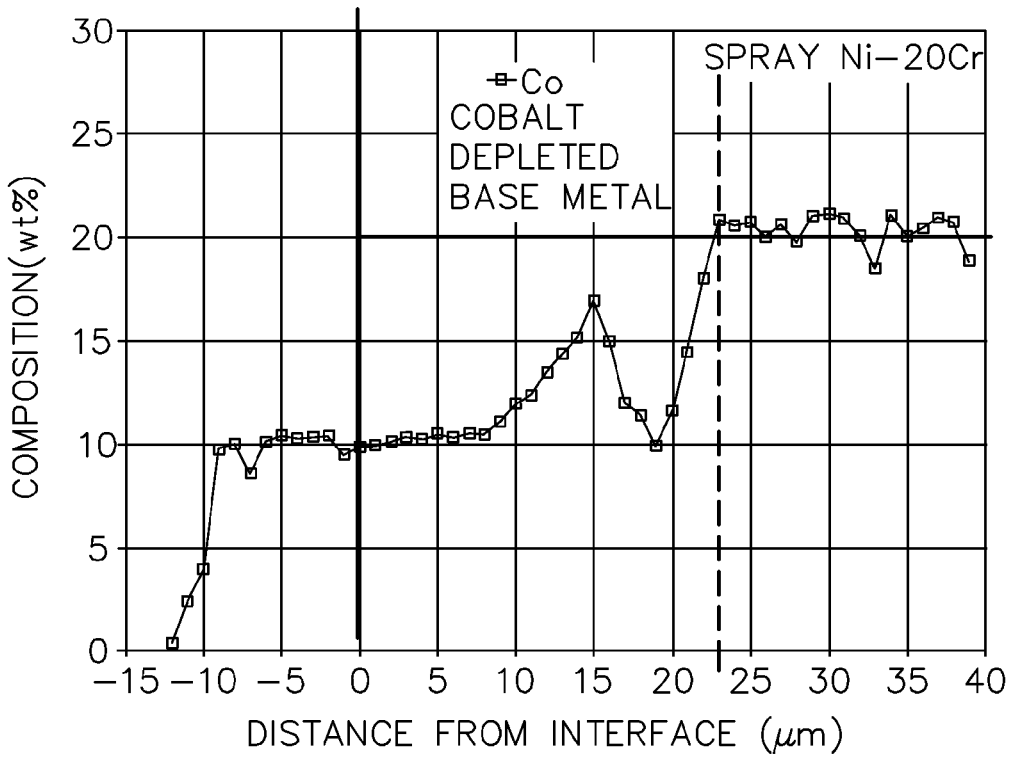
FIG. 8 is a plot of cobalt levels in coatings after thermal exposure for coatings without cobalt.
Figure 9:
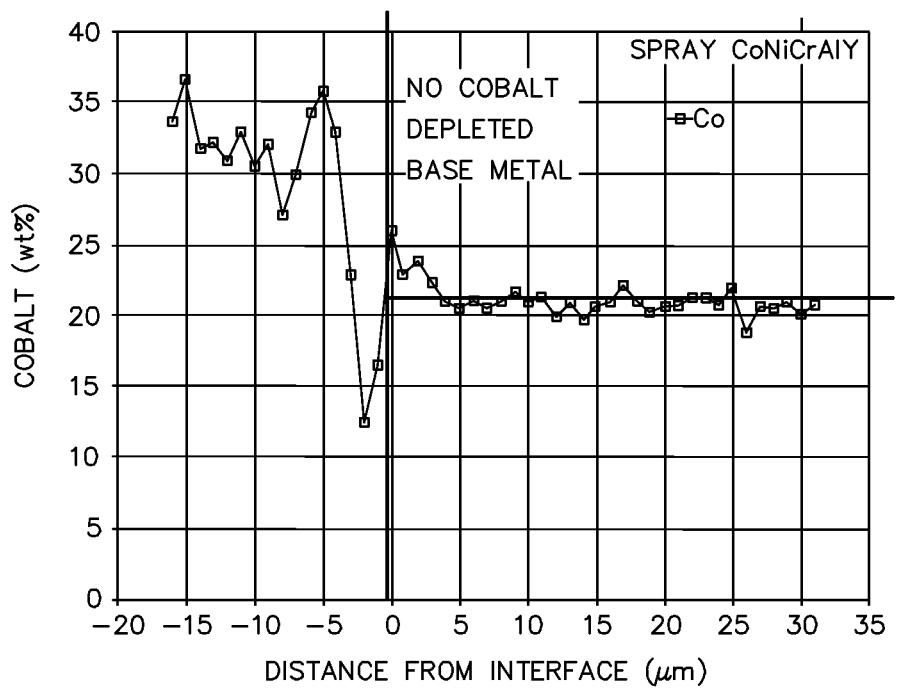
FIG. 9 is a plot of cobalt levels in coatings after thermal exposure for coatings with cobalt.

FIG. 8 is a plot of cobalt level which exemplifies thermal exposure effects for a cobalt-containing substrate which has been coated with a cobalt-free coating. FIG. 8 shows cobalt depletion in the substrate due to diffusion of cobalt into the coating. FIG. 9 is a plot of cobalt level for a cobalt-containing substrate coated with a cobalt-containing coating after thermal exposure. As indicated in FIG. 9, in the coating with cobalt, there is no cobalt depletion in the base metal.

Elevated aluminum content along with an elevated chromium level provides favorable environmental behavior. In general, above about 1200 K (about 927° C. or about 1700° F.), aluminum additions offer improved stability of $Al_2O_3$ over chromium as volatile non-protective chromium oxides may form at higher temperatures. According to the particular embodiments of the present invention, a significant aluminum concentration provides improved oxidation at much lower temperatures than previously understood. For a more particular oxidation resistance, the aluminum content may be higher than the base metal and for most common high strength nickel base superalloys the aluminum content of at least about 2 wt %, in another embodiment at least about 5% and more particularly at least about 8%. Higher levels of aluminum may be limited by the potential to result in low cycle fatigue debits. Although useful levels of aluminum up to 6% may be added to simple NiCr based coatings even higher aluminum contents are desirable to more freely balance corrosion resistance primarily conferred by chromium content and oxidation resistance, primarily conferred by aluminum.

Figure 12:
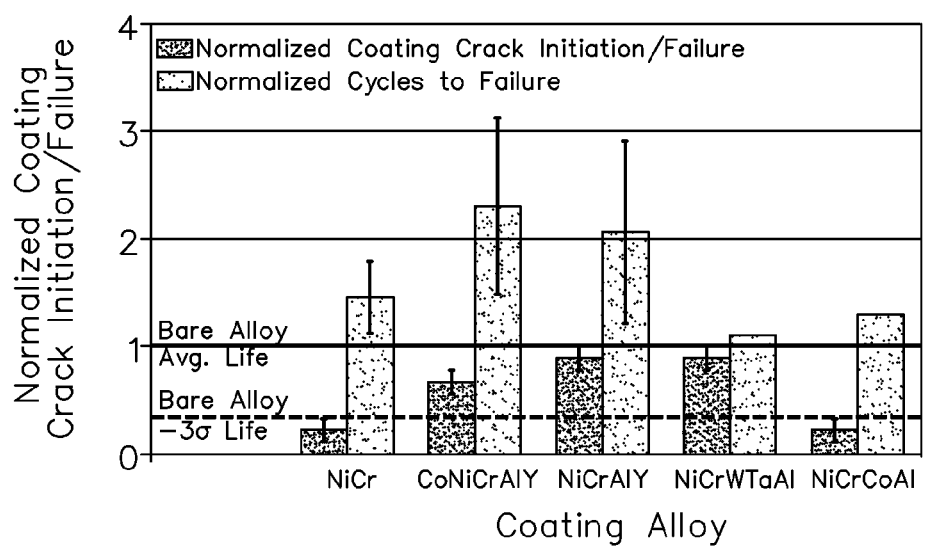
FIG. 12 is a graph showing coating crack initiation or failure (cycles) at 760° C. (1400° F.) LCF for various coatings.

Remarkably improved fatigue behavior with aluminum contents up to 10% or more are achieved by modification of the NiCr composition by the addition of cobalt and/or yttrium. FIG. 12 is a graph showing coating crack initiation or failure (cycles) at about 1033 K (about 760° C. or about 1400° F.) LCF for various coatings. As indicated in FIG. 12, while NiCr coated bars cycled in LCF showed coating cracks after only about 2,000 cycles, similarly processed coatings with the same thickness and with the addition of aluminum, yttrium, and/or cobalt according to the present invention show a delay in coating cracks not to occur until the cycle count is within the typical fatigue life range of the base metal alloy.

According to an embodiment of the present invention, the coating may be used at temperatures of about 815° C. (1500° F.) or higher.

The life of a turbine disk may be optimized through the use of the coating compositions of the present invention, along with selection of a combination of coating thickness, microstructure, and post coating finishing, as discussed below.

As the coating thickness may affect coating performance, the thickness according to an embodiment of the present invention sufficiently thin and ductile to enable compressive stresses to be induced in the underlying substrate through shot peening without cracking the coating. Additionally such coatings may be applied in areas impacting component contact, or fit with mating components, or assembly into the rotor structure. In such cases a minimal coating thickness may be desirable to confer enhanced environmental resistance while minimizing impact on dimensional tolerances impacting such contact, fit or assembly characteristics. For example, the coating in an embodiment of the present invention may be about 5 to about 100 microns thick. According to an embodiment of the present invention, the coating may be about 10 to about 90 microns thick. According to another embodiment of the present invention, the coating may be about 12 to about 75 microns thick. In yet another embodiment, the coating may have a thickness that is about 5 μm to about 38 μm.

According to an embodiment of the present invention, the thickness of the coating may be varied depending on the composition of the coating, for different substrates, for different components, and for different regions of a component. For example, for some rotor alloys, coating thickness greater than about 50 μm (about 2 mils) have been shown to reduce LCF life even with post coating finishing operations. Thus for regions or locations which limit the cyclic life of the components, in an embodiment, the coating is less than about 50 microns (μm). Suitable thicknesses for the coating of an embodiment of the present invention may be significantly less than MCrAlX coatings applied to blades, vanes, and other components of gas turbine engines. In other applications, such as structural components or blades, coating thicknesses of about 100 microns may be used, while not reducing the minimum fatigue life of the component.

Figure 13:
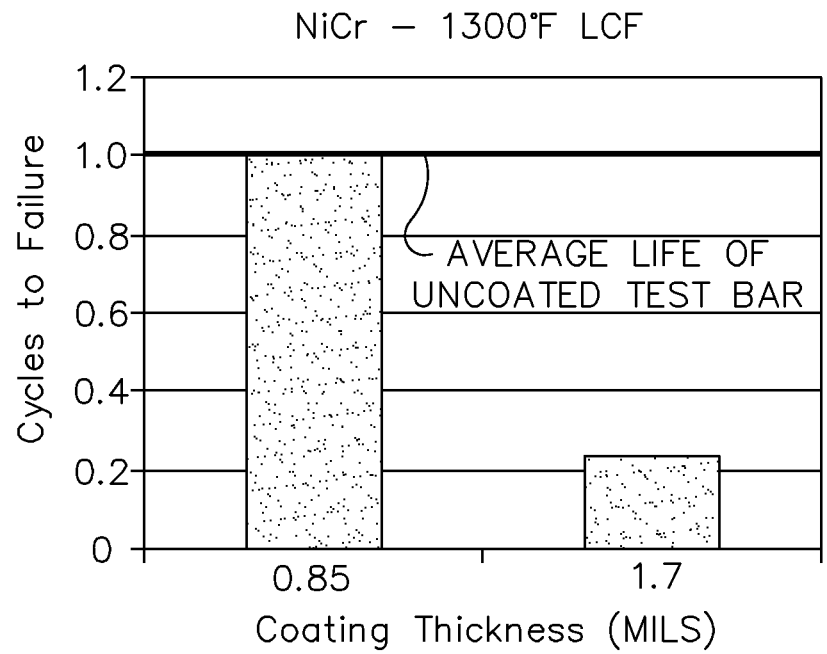
FIG. 13 is a graph illustrating fatigue life of a NiCr coating as a function of coating thickness.
Figure 14:
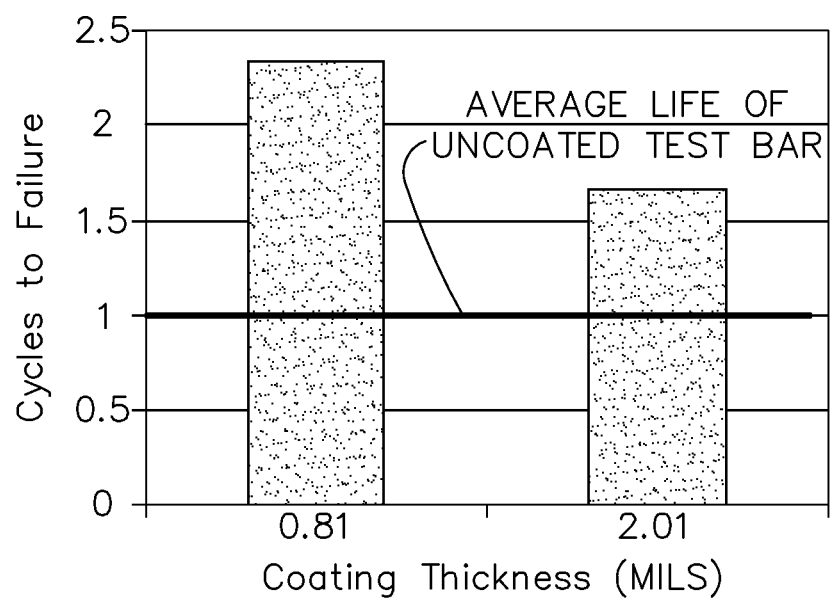
FIG. 14 is a graph illustrating fatigue life of a CoNiCrAlY according to an embodiment of the present invention coating as a function of coating thickness.

FIG. 13 is a graph illustrating fatigue life of a NiCr coating as a function of coating thickness. FIG. 14 is a graph illustrating fatigue life of a CoNiCrAlY coating according to an embodiment of the present invention as a function of coating thickness. As indicated in FIGS. 13 and 14, the CoNiCrAlY coating provides significantly longer cycle life at 760° C. (1400° F.) as compared to a NiCr coating at 704° C. (1300° F.).

According to an embodiment of the present invention, the coating may include one or more layers.

The coating thickness may be controlled by the coating deposition process or by post coating processing. Deposition techniques, including, but not limited to chemical vapor deposition (CVD), physical vapor deposition (PVD), atomic layer deposition (ALD), plating, thermal spraying, including, but not limited to high velocity air fuel (HVAF), etc., and diffusion coating processes known in the art, may be used to apply the coating. For example, the thermal spray method as described in U.S. Patent Application Publication No. 2011/0293919, which is incorporated by reference, may be used to apply the coating in an embodiment of the present invention. Each of these coating deposition processes enables the coating to be metallurgically bonded to the substrate through the use of a low temperature diffusion heat treatment, for example, more particularly at a temperature of about 540° C. to about 760° C. (about 1000° F. to about 1400° F.) for a period of about eight to about twenty-four hours. In another embodiment, for example, the coating can be metallurgically bonded to the substrate through the use of a low temperature diffusion heat treatment at a temperature of about 540° C. to about 650° C.

To promote adhesion, the substrate surface 24 may undergo a mechanical (e.g., grit blasting) and/or chemical pretreatment or other surface preparation well known to those knowledgeable in the art. Alternatively such coatings may be deposited in excess of the desired thickness and post coating processing may be used to achieve the final desired coating thickness.

In contrast to the improved strain tolerance and reduced cracking of a columnar TBC in turbine airfoil applications, typically attributed to reduced stress build up within the coating, the present invention demonstrates that a disk coating having finer grained particles provides improved resistance to cracking during fatigue testing versus a large grained near columnar structure of similar composition and thickness. Thus an important component of an improved environmental disk coating is microstructural control to maintain a fine grain size. According to an embodiment of the present invention, the average grain size of the particles in the coating may range from about 0.1 microns to about 5 microns. According to an embodiment of the present invention, the average grain size may be from about 0.5 microns to about 2.5 microns. Grain size is maintained after stress and temperature exposure with multiple grains, typically observed as being greater than 5 grains per 25 microns of coating thickness. According to an embodiment of the present invention, the coating may have multiple grains through the thickness instead of a single or few grains spanning the thickness of the coating, as this may help delay coating cracks during LCF.

Generally, coarser grained coatings exhibit a higher cracking frequency. For example, measurements have shown a 4× increase in cracking frequency with coarser grained coatings. Additionally, cracks propagate through the coating more quickly for coarse grained coatings. Interrupted fatigue testing has shown cracks through the entire thickness of the coarse grained coating after 5000 cycles, while cracks in the fine grained coating penetrate less than 50% through the coating thickness after 7000 cycles at the same cyclic test conditions.

Figure 15:
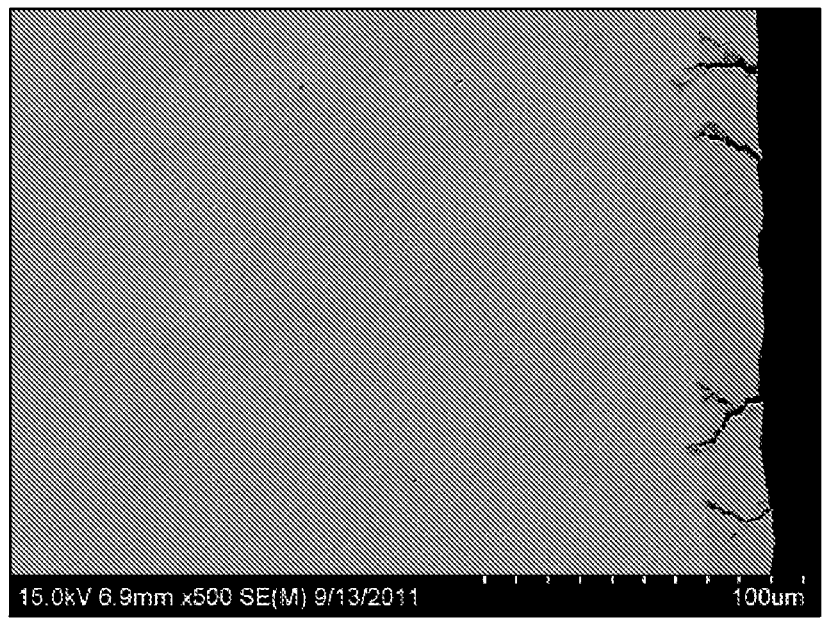
FIG. 15 is a micrograph showing cracking in a coarse grain coating tested in fatigue at about 705° C./0.713% strain range (1300° F./0.713% strain range)
Figure 16:
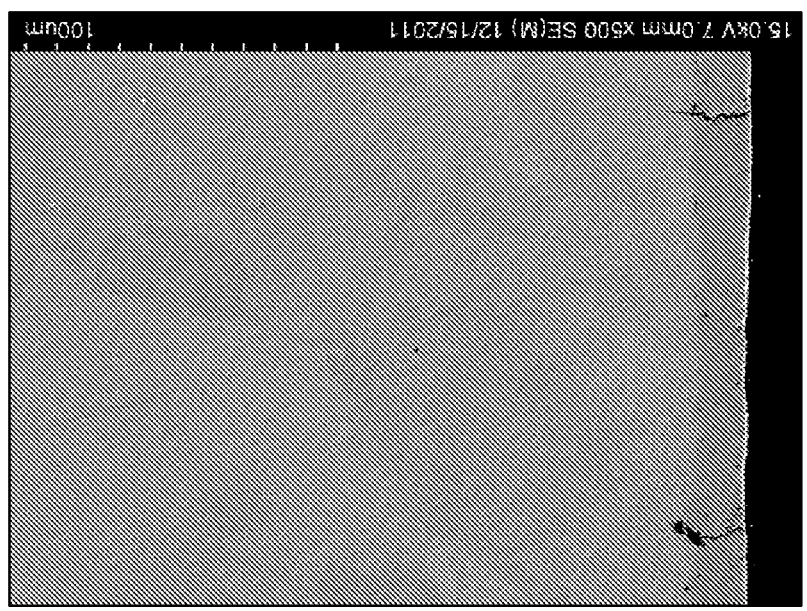
FIG. 16 is a micrograph showing cracking in a fine grain coating tested in fatigue at about 705° C./0.713% strain range (1300° F./0.713% strain range)

FIGS. 15 and 16 are micrographs depicting coarse and fine grain coatings, respectively, having the same nominal composition and thicknesses of about 25.4 µm (1.0 mil) and 22.3 µm (0.8 mil), respectively. The coatings were tested under the same conditions about 705° C./0.713% strain range (1300° F./0.713% strain range) for 28 k cycles for the coarse grain coating and 142*k* cycles for the fine grain coating. As indicated in the micrographs, the coarse grain coating of FIG. 15 also showed increased cracking compared to the fine grain coating of FIG. 16 when tested in fatigue at the same about 705° C./0.713% strain range (1300° F./0.713% strain range) conditions.

Figure 17:
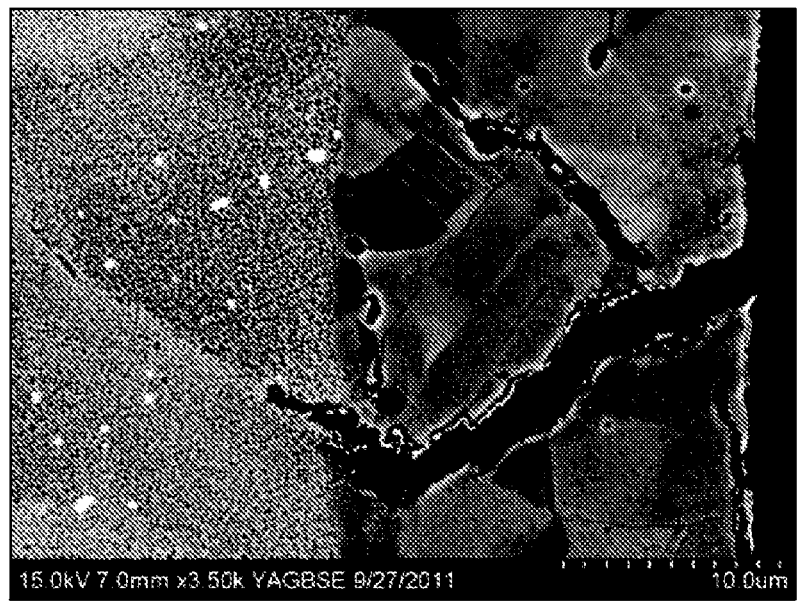
FIG. 17 is a high magnification micrograph showing cracks in a coarse grain coating tested in low cycle fatigue (LCF)
Figure 18:
FIG. 18 is a high magnification micrograph showing cracks in a fine grain coating tested in LCF.

FIG. 17 is a high magnification micrograph showing cracks in a coarse grain coating, and FIG. 18 is a high magnification micrograph showing cracks in the fine grain coating, where the coatings have the same nominal composition and thickness of about 20 microns. The coarse grain coating was found to have an average of 352 cracks/in whereas the fine grain coating was found to have an average of 80 cracks/in.

Figure 19:
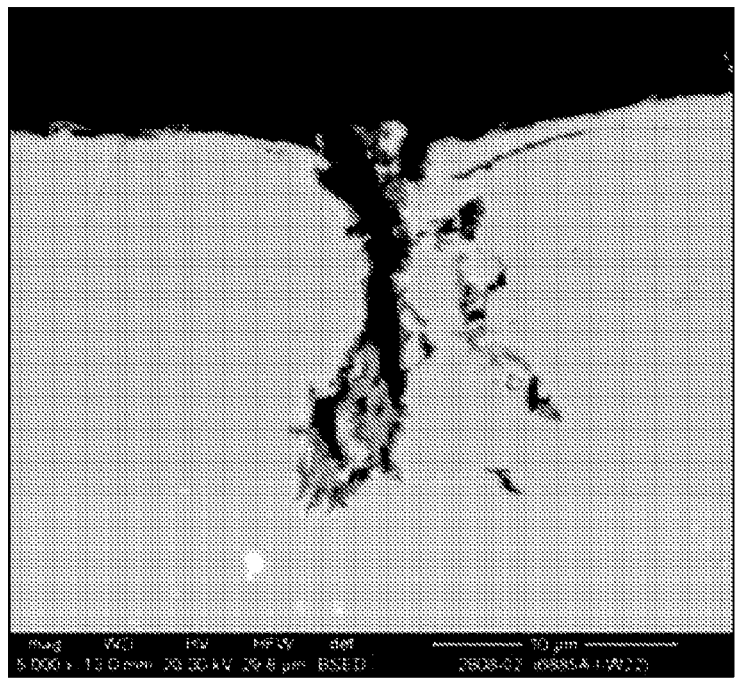
FIG. 19 is a cross section from interrupted cyclic fatigue tests at about 705° C./0.713% strain range (1300° F./0.713% strain range) for a coarse grained coating.
Figure 20:
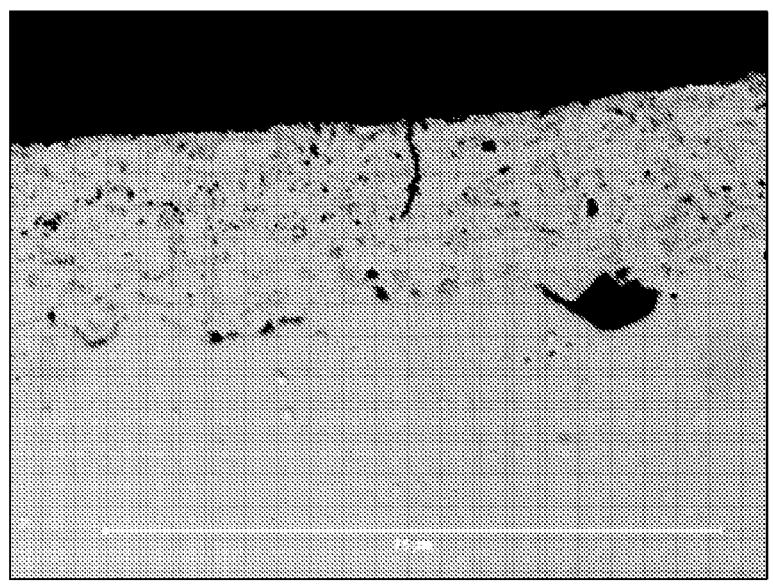
FIG. 20 is a cross section from interrupted cyclic fatigue tests at about 705° C./0.713% strain range (1300° F./0.713% strain range) for a fine grained coating.

FIG. 19 is a cross section from interrupted cyclic fatigue tests at about 705° C./0.713% strain range (1300° F./0.713% strain range) for a coarse grained coating, and FIG. 20 is a cross section from interrupted cyclic fatigue tests at about 705° C./0.713% strain range (1300° F./0.713% strain range) for a fine grained coating. FIGS. 19 and 20 show that crack propagation occurs more quickly through coarse grained coatings, which occurs at about 5 k cycles, as compared to a fine grained coatings, which occurs at 7 k cycles for this test condition.

Analysis suggests grain growth may be controlled by Zener pinning mechanisms through the proper distribution of pinning agents. For example, pinning agents may include ceramic particles, such as oxides, carbides, nitrides, oxy-carbides, oxy-nitrides, or oxy-carbonitrides, or combinations thereof. Suitable oxides may include, but are not limited to oxides of aluminum, titanium, yttrium, hafnium, zirconium, lanthanum and mixtures thereof. Suitable carbides may include, but are not limited to carbides of titanium, tantalum, niobium, zirconium, hafnium, and mixtures thereof. Suitable oxy-nitrides may include, but are not limited to titanium, tantalum, niobium, hafnium, zirconium, and yttrium and mixtures thereof.

Figure 21:
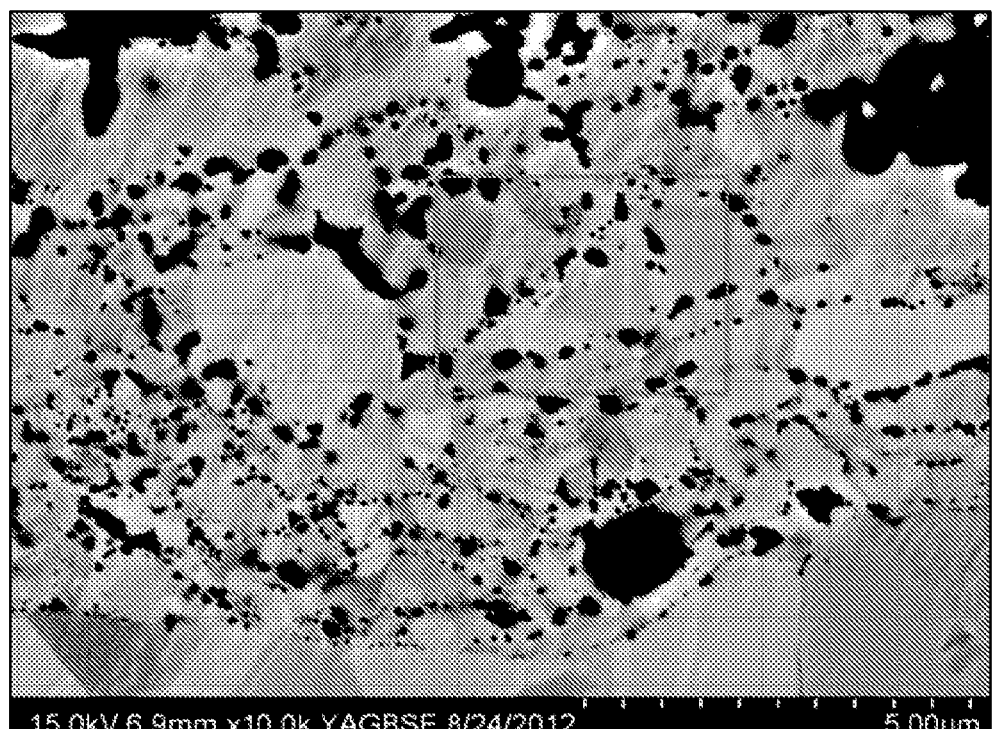
FIG. 21 is a micrograph of coating cross-sections showing grain boundary pinning.
Figure 22:
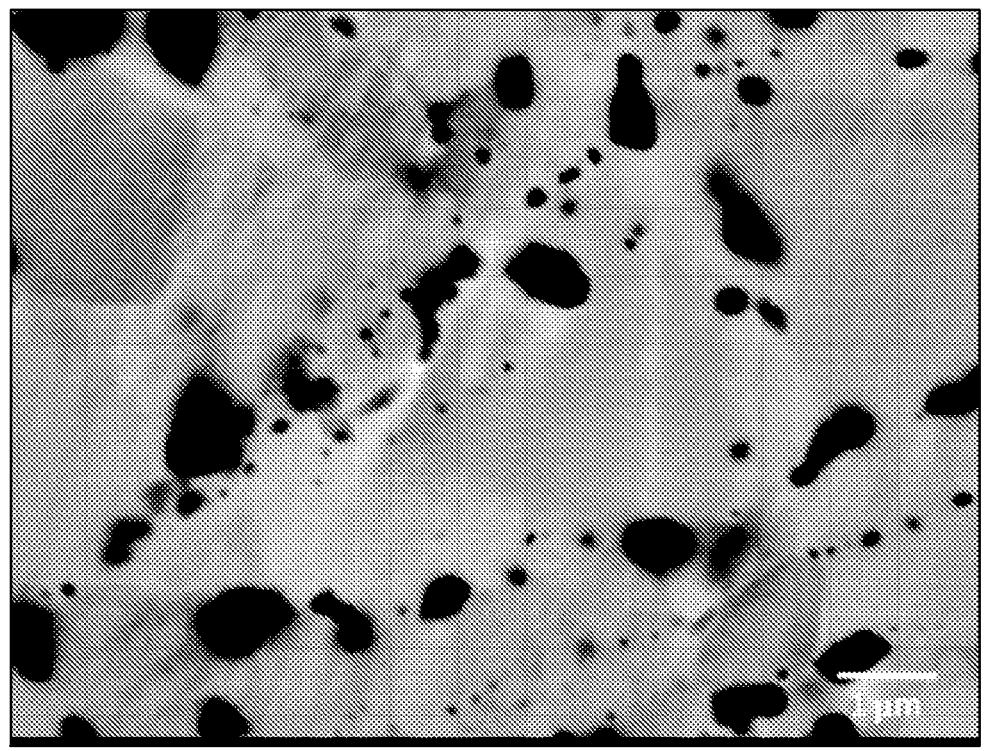
FIG. 22 is a micrograph showing the selected region of FIG. 21 in greater detail.

FIG. 21 is a micrograph of coating cross-sections showing grain boundary pinning FIG. 22 shows the selected region of FIG. 21 in greater detail. According to the embodiment of the present invention, the pinning particles may include, but are not limited to aluminum oxide particles.

Additionally higher levels of such elements may serve to getter sulfur pick up in-service further enhancing coating behavior. Coating behavior may be further enhanced by improving grain boundary ductility. Zirconium, hafnium and boron are all know to provide improved grain boundary strength and or ductility. Carbon is added as a de-oxidant and also may improve grain boundary strength. Such additions are well known in the art and one with ordinary skill may define an optimum value of these elements for the inventive coating for a particular application by simple experimentation and not deviate from the essence of an embodiment the present invention claimed here.

The pinning particles may be made to occur as part of the coating deposition process, as part of the precursor coating material, or subsequent thermo-mechanical processing of the coating. In addition, pinning may occur from the addition of pinning elements to the coating chemistry or precursor materials.

In general, pinning may be enhanced when pinning agents are properly distributed by the coating applications process or subsequent thermo mechanical processing of the coating. Such grain boundary pinning or proper distribution of pining agents may be achieved by oxides which may be sub-micron in size. For example suitable pinning agent particles may have diameters in the range of about 0.05 to about 1 micron.

While the invention has been described in terms of one or more particular embodiments, it is apparent that other forms could be adopted by one skilled in the art. It is to be understood that the use of "comprising" in conjunction with the coating compositions described herein specifically discloses and includes the embodiments wherein the coating compositions "consist essentially of" the named components (i.e., contain the named components and no other components that significantly adversely affect the basic and novel features disclosed), and embodiments wherein the coating compositions "consist of" the named components (i.e., contain only the named components except for contaminants which are naturally and inevitably present in each of the named components).

Figure 4:
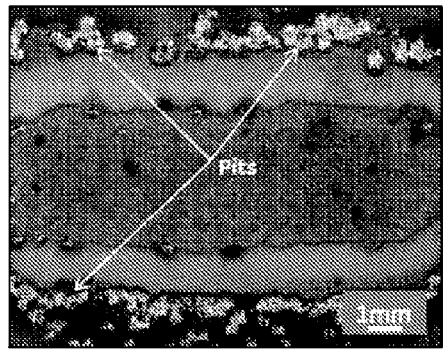
FIG. 4 is a micrograph showing pitting at 1300° F. of an uncoated René® 104 sample after 1 cycle.
Figure 5:
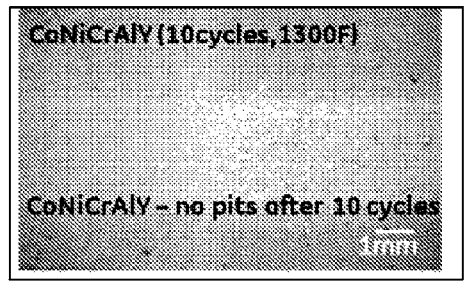
FIG. 5 is a micrograph showing that a CoNiCrAlY coated sample of René® 104 at 1300° F. did not exhibit pitting after 10 cycles.

Laboratory corrosion testing using a mixed sulphate corrodent cited previously resulted in extensive pitting after one 24 hour exposure cycle whereas samples coated in accordance with the characteristics of an embodiment the present invention passed 10 laboratory test cycles with no evidence of base metal attack and no significant attack of the coating. FIG. 4 is a micrograph showing pitting at about 705° C. (1300° F.) of an uncoated René® 104 sample after 1 cycle. FIG. 5 is a micrograph showing that a CoNiCrAlY coated sample of René® 104 at about 705° C. (1300° F.) did not exhibit pitting after 10 cycles.

Figure 10:
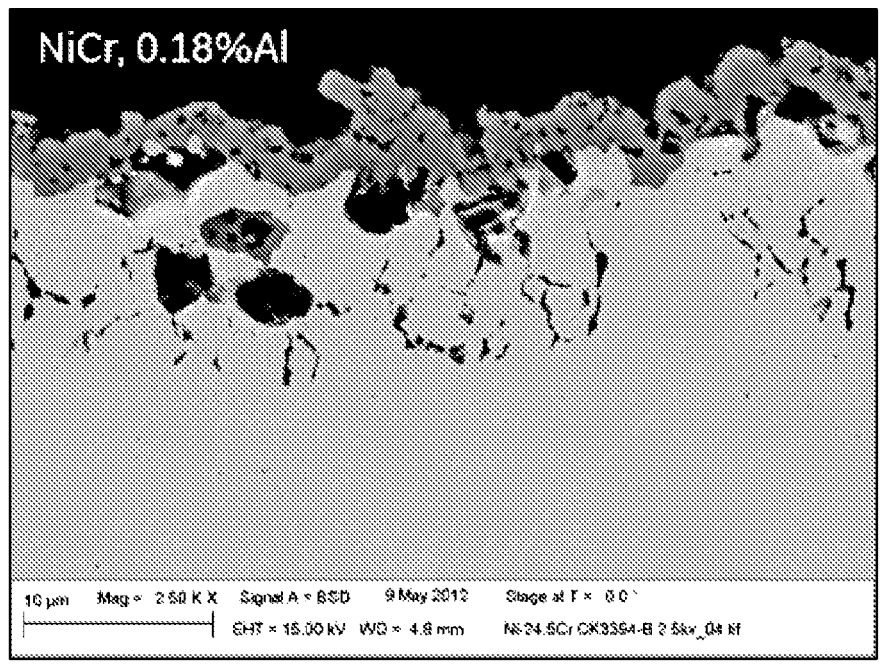
FIG. 10 is a cross-section of a coating having 0.18 wt % Al after about 815° C. (1500° F.) isothermal exposure.
Figure 11:
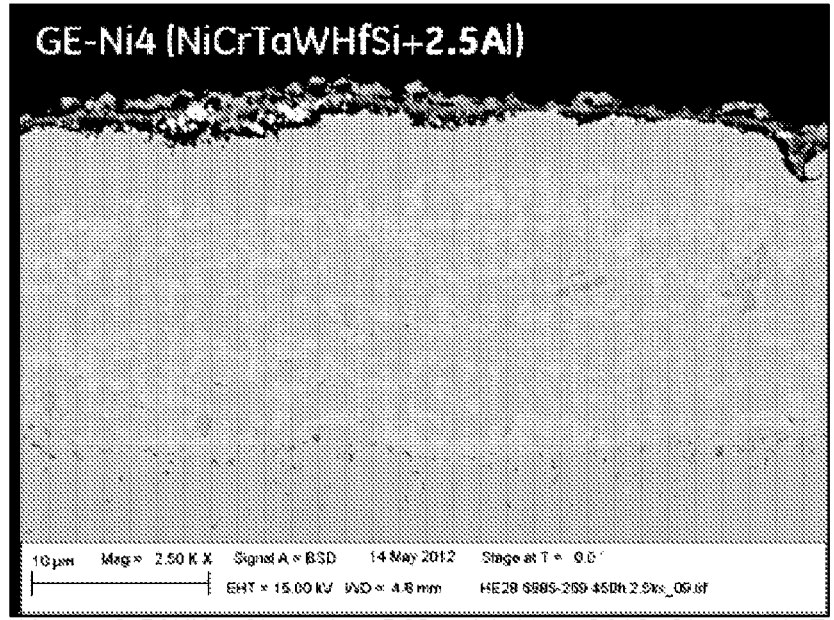
FIG. 11 is a cross-section of a coating having 2.5 wt % Al after about 815° C. (1500° F.) isothermal exposure.

FIGS. 10 and 11 are cross-sections of coatings having 0.18 wt % Al and 2.5 wt % Al, respectively, after about 1088 K isothermal exposure. As indicated in FIGS. 10 and 11, the coating with 2.5 wt % aluminum shows significantly reduced oxidation attack than the coating with 0.18 wt % aluminum.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbine component, comprising:
    a superalloy substrate; and
    a coating on the superalloy substrate, wherein the coating defines an external surface of the turbine component that is exposed to a hot gas flow path in a gas turbine, and wherein the coating comprises:
        15 wt % to 45 wt % cobalt;
        20 wt % to 40 wt % chromium;
        2 wt % to 15 wt % aluminum;
        0.1 wt % to 1 wt % yttrium; and
        nickel;
    wherein the coating comprises a distribution of pinning agents, the pinning agents are located at the interfaces between grains defined in the coating, and the average grain size of the coating is 0.1 microns to 5 microns.

2. The turbine component of claim 1, wherein the coating comprises 30 wt % to 40 wt % cobalt, and wherein the coating comprises 55 wt % to 75 wt % of a combined amount of nickel and cobalt.

3. The turbine component of claim 1, wherein the coating comprises 21 wt % to 30 wt % chromium.

4. The turbine component of claim 1, wherein the coating comprises 5 wt % to 14 wt % aluminum.

5. The turbine component of claim 1, wherein the coating has a thickness on the superalloy substrate that is 5 µm to 100 µm.

6. The turbine component of claim 1, wherein the average grain size of the coating is 0.5 microns to 2.5 microns.

7. The turbine component of claim 1, wherein the coating is deposited by chemical vapor deposition, atomic layer deposition, physical vapor deposition, plating, thermal spray, or diffusion coating processes, and wherein the superalloy substrate comprises a nickel-based superalloy, a cobalt-based superalloy, or an iron-based superalloy.

8. The turbine component of claim 1, wherein the pinning agents comprise ceramic particles, and wherein the ceramic particles comprise oxides of aluminum, titanium, yttrium, hafnium, zirconium, lanthanum, or mixtures thereof; carbides of titanium, tantalum, niobium, zirconium, hafnium, or mixtures thereof; oxy-nitrides of titanium, tantalum, niobium, hafnium, zirconium, and yttrium or mixtures thereof; or a combination thereof.

9. The turbine component of claim 1, wherein the coating further comprises at least one of lanthanum, cerium, zirconium, magnesium, a rare earth metal, or a combination thereof.

10. The turbine component of claim 1, wherein the coating further comprises:
    0 wt % to 10 wt % tungsten;
    0 wt % to 10 wt % tantalum;
    0 wt % to 0.5 wt % hafnium; and
    0 wt % to 0.5 wt % silicon.

11. The turbine component of claim 1, wherein the coating further comprises: tungsten, molybdenum, tantalum, rhenium, titanium, niobium, vanadium, a platinum group metal, or a combination thereof, wherein the total combined amount of these elements is 20 wt % or less.

12. The turbine component of claim 1, wherein the coating consists essentially of:
    30 wt % to 40 wt % cobalt;
    22 wt % to 25 wt % chromium;
    8 wt % to 12 wt % aluminum;
    0.1 wt % to 1 wt % yttrium; and
    nickel.

13. The turbine component of claim 1, wherein the coating consists essentially of:
    30 wt % to 40 wt % cobalt;
    22 wt % to 25 wt % chromium;
    8 wt % to 12 wt % aluminum;
    0.1 wt % to 1 wt % yttrium;
    nickel; and
    the distribution of pinning agents.

14. A gas turbine comprising the turbine component of claim 1, wherein the turbine component is positioned within a hot gas flow path of the gas turbine such that the coating exposed to the hot gas flow path protects the superalloy substrate within the gas turbine.

15. The turbine component of claim 1, wherein the coating has a thickness on the superalloy substrate that is 10 µm to about 90 µm.

16. The turbine component of claim 1, wherein the coating has a thickness on the superalloy substrate that is 12 µm to 75 µm.

* * * * *